INVENTORS
YUZURU INOUE
AKIYOSHI MORITA

BY Louis Bernat
ATTORNEY

INVENTORS
YUZURU INOUE
AKIYOSHI MORITA
BY
ATTORNEY

April 29, 1969 YUZURU INOUE ETAL 3,441,687

CHANNEL MIXING SYSTEM FOR MULTIPLE ROTATING HEADS

Filed March 31, 1965 Sheet 3 of 3

INVENTORS
YUZURU INOUE
AKIYOSHI MORITA

BY

ATTORNEY 3,441,687

CHANNEL MIXING SYSTEM FOR MULTIPLE ROTATING HEADS

Yuzuru Inoue, Tokyo, and Akiyoshi Morita, Yokohama, Japan, assignors to Victor Company of Japan, Limited, Yokohama, Japan, a corporation of Japan Filed Mar. 31, 1965, Ser. No. 444,226
Claims priority, application Japan, Apr. 1, 1964, 39/18,229
Int. Cl. G11b 5/00; H04n 5/76
U.S. Cl. 179—100.2 5 Claims

ABSTRACT OF THE DISCLOSURE

The invention provides a channel mixing system for producing a continuous FM signal in response to a plurality of received FM signals. Each of the received FM signals has alternate on and off portions. The on portion of each signal ends after the beginning of the on portion of the next signal to provide an overlap period when the two signals occur simultaneously. All of the signals are applied to the mixer circuit at substantially the same amplitude level during non-overlap periods. Clamping pulse signals are produced during the overlap periods for clamping the amplitude level of one of the overlapped signals to a lower value than the amplitude level of another overlapped signal so that a substantially constant output signal is produced by the mixer circuit irrespective of variations in the relative phase of the overlapped signals.

This invention relates to a channel mixing system and more particularly to a channel mixing system operative for producing a continuous FM signal from a plurality of discontinuous signals, without generating noise, beat or interference components or the like, and in a highly stable and reliable manner.

Although having other applications, the system of this invention is particularly advantageous when used in a magnetic recording and reproducing system of the type used for television video signals, wherein FM signals are recorded and reproduced by a plurality of rotating magnetic heads which trace tracks from one edge to the other of a magnetic tape. In reproduction, it is necessary to mix or switch the signals from the separate heads into a common output circuit. It has been proposed to apply a gate system which makes use of a pulse having a very short rise time but it is found that the switching control signal has high frequency components which leak into the signal transmission channel to produce interference components and degrade the quality of the reproduced picture, or in some cases a portion of the signal may be removed.

In another proposed system, FM signals are overlapped and mixed directly. As an example, a system has been proposed having two magnetic heads rotating at 30 revolutions per second, with overlap periods of $\frac{1}{640}$ seconds. When signals from the two heads are mixed, however, beat disturbances and cancellation effects are unavoidable and in addition, noise is produced in the absence of a signal to greatly degrade picture quality.

The principal object of this invention is to provide a channel mixing system which avoids the above difficulties of prior proposed systems and which operates in a stable and reliable manner.

Another object of this invention is to provide a channel mixing system which is relatively simple and inexpensive in construction and which is not critical in adjustment.

A further object of this invention is to provide a channel mixing system in which leakage of switching signals and noise into signal transmission channels is substantially obviated.

According to this invention, overlapped portions of FM signals are applied to a mixer circuit at substantial amplitude levels but with a substantial difference in amplitude levels such that a substantial output signal is produced by the mixer circuit irrespective of variations in the relative phase of the overlapped signals. With this feature, interference due to beats and cancellation effects are obviated. In addition, due to the simplicity of the operation, no complex and expensive circuitry is required and the system is highly reliable and does not require critical adjustments.

An important feature of the invention is in the provision of means for changing the amplitude of one of the signals during the overlap period while applying the signals to the mixer circuit with substantially the same amplitude during non-overlap periods.

Further important features of the invention relate to simple but highly effective and reliable means for developing and applying clamping signals to produce a reduction in amplitude of one signal during each overlap period.

Another feature relates to circuitry for further minimizing leakage of noise or interference components into signal transmission channels.

These and other objects, features and advantages will become more fully apparent from the following detailed description taken in conjunction with the accompanying drawings which illustrate a preferred embodiment and in which.

Figure 1:
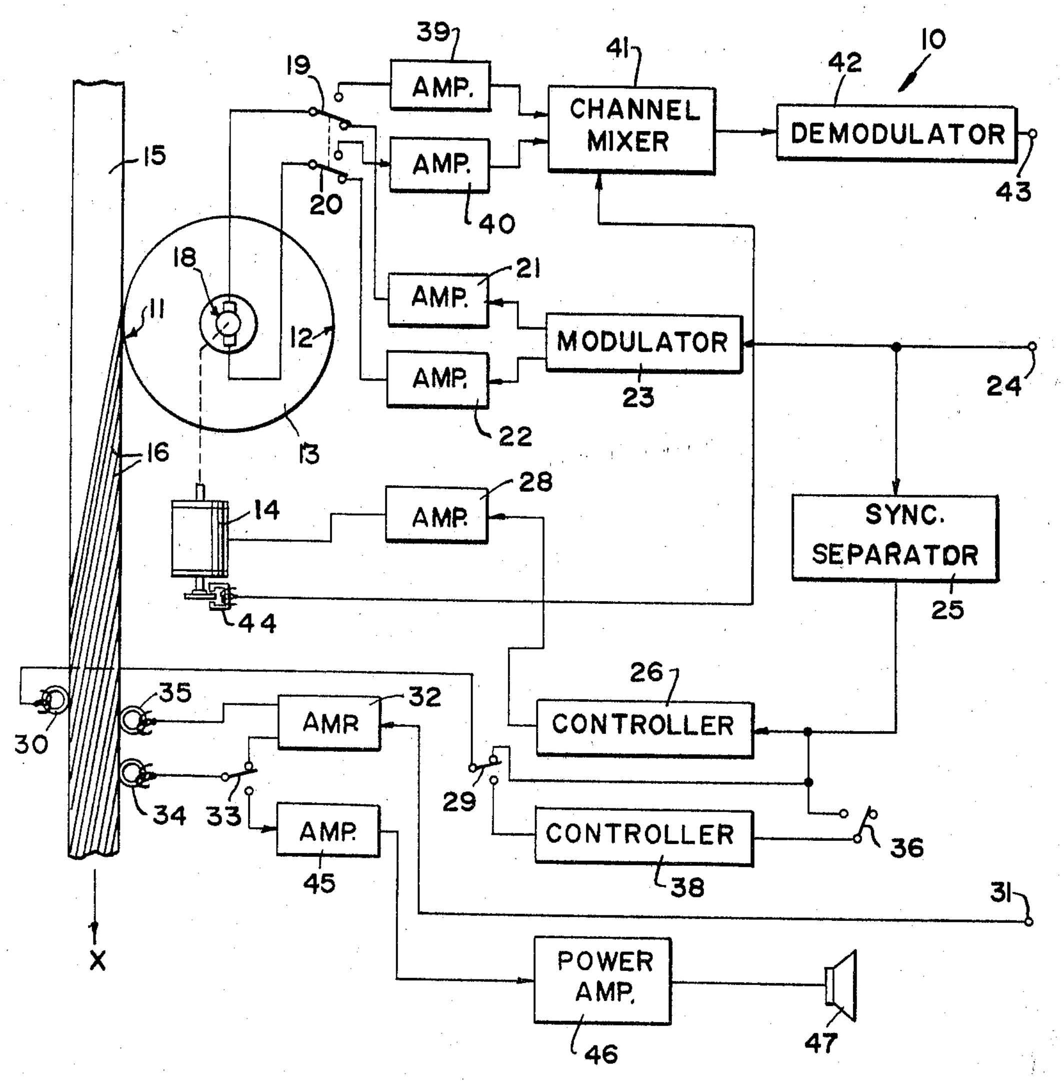
FIGURE 1 is a schematic block diagram of a magnetic recording and reproducing system using a channel mixing system according to the invention.

Referring to FIGURE 1, reference numeral 10 generally designates a magnetic recording and reproducing system constructed according to the principles of this invention.

The system 10 comprises a pair of magnetic heads 11 and 12 carried at diametrically opposite points on a rotatable disc 13 which is driven by a motor 14. As diagrammatically illustrated, the heads 11 and 12 are arranged to be brought into engagement with a magnetic tape 15 to trace tracks 16 extending obliquely from one edge of the tape 15 to the other, as the tape 15 is moved in the direction of arrow X. The arrangement is such that each of the heads is in engagement with the tape while being rotated through an angle of slightly more than 180 degrees. It is here noted that the invention is not necessarily limited to a system having only two magnetic heads and the principles of the invention can be applied to a system having three or more heads, but in any case each head should engage the tape through an angle slightly greater than 360 degrees divided by the number of heads.

The heads 11 and 12 are respectively connected through a slip ring assembly 18 to ganged record-reproduce selector switches 19 and 20. In the record position of the switches 19 and 20 as illustrated, the heads 11 and 12 are connected to the outputs of a pair of recording amplifiers 21 and 22 which have inputs connected to outputs of a frequency modulator circuit 23 to which a signal to be recorded is applied from an input terminal 24.

The signal to be recorded is preferably a television video signal having vertical synchronizing signal components which are separated out by a separator circuit 25 to develop a rectangular wave which is applied to a controller 26 operative to convert the rectangular wave into a sine wave. The sine wave so developed is applied through an amplifier 28 to the motor 14 to rotate the disc 13 and the heads 11 and 12 in synchronizm with the vertical synchronizing signal components.

At the same time, the rectangular wave from the separator circuit 25 is applied through another record-reproduce switch 29 to a stationary magnetic head 30 to record the rectangular wave along one of the edges of the magnetic tape 15.

In addition, an audio signal may be applied from a terminal 31 and through an amplifier 32 and another record-reproduce switch 33 to a magnetic head 34 to record the audio signal along the opposite edge of the tape 15. The amplifier 32 may also apply an erasing current to an erasing head 35.

To reproduce the signals so recorded on the magnetic tape 15, the record-reproduce switches 19, 20, 29, 33 and an additional switch 36 are moved to positions opposite those illustrated, and the magnetic tape 15, after being rewound, is again moved in the direction of arrow X. The rectangular wave or synchronizing signal recorded on one edge of the tape is then reproduced by the head 30 and is applied through the switch 29, a controller 38 and the switch 36 to the controller 26 which converts the reproduced rectangular wave to a sine wave which is applied through the amplifier 28 to the motor 14 to rotate the disc 13 and the heads 11 and 12 at a speed synchronized to the movement of the tape 15 to cause the heads 11 and 12 to engage the tape 15 along the tracks previously recorded on the tape 15.

Accordingly, the heads 11 and 12 reproduce the FM signals previously recorded on the tape 15. Such FM signals are applied through the slip ring assembly 18 and the switches 19 and 20 to amplifiers 39 and 40 which apply amplified FM signals to a channel mixer circuit 41 constructed according to the principles of this invention. The channel mixer circuit 41 produces a continuous FM signal which is applied to a demodulator circuit 42 which operates to develop a signal at output terminal 43 corresponding to the original signal applied to terminal 24. The demodulator circuit 42 may include a frequency converter for shifting the FM signal to a higher frequency range before detection and in any case includes a limiter circuit for minimizing the effect of amplitude variations in the applied FM signal.

To properly combine the reproduced FM signals in the channel mixer circuit 41, it is necessary to have a signal indicative of the overlap time intervals and for this purpose, a tonewheel 44 is mounted on the shaft of the motor and is adapted to apply a pulse to the mixer circuit 41 at the end of each half-revolution of the motor, each pulse being generated at about the time when one head starts to engage the tape 15 and before the time when the other head leaves the tape 15.

The audio signal previously recorded on the tape 15 is reproduced by the head 34 and is applied through amplifiers 45 and 46 to a speaker 47.

Figure 2:
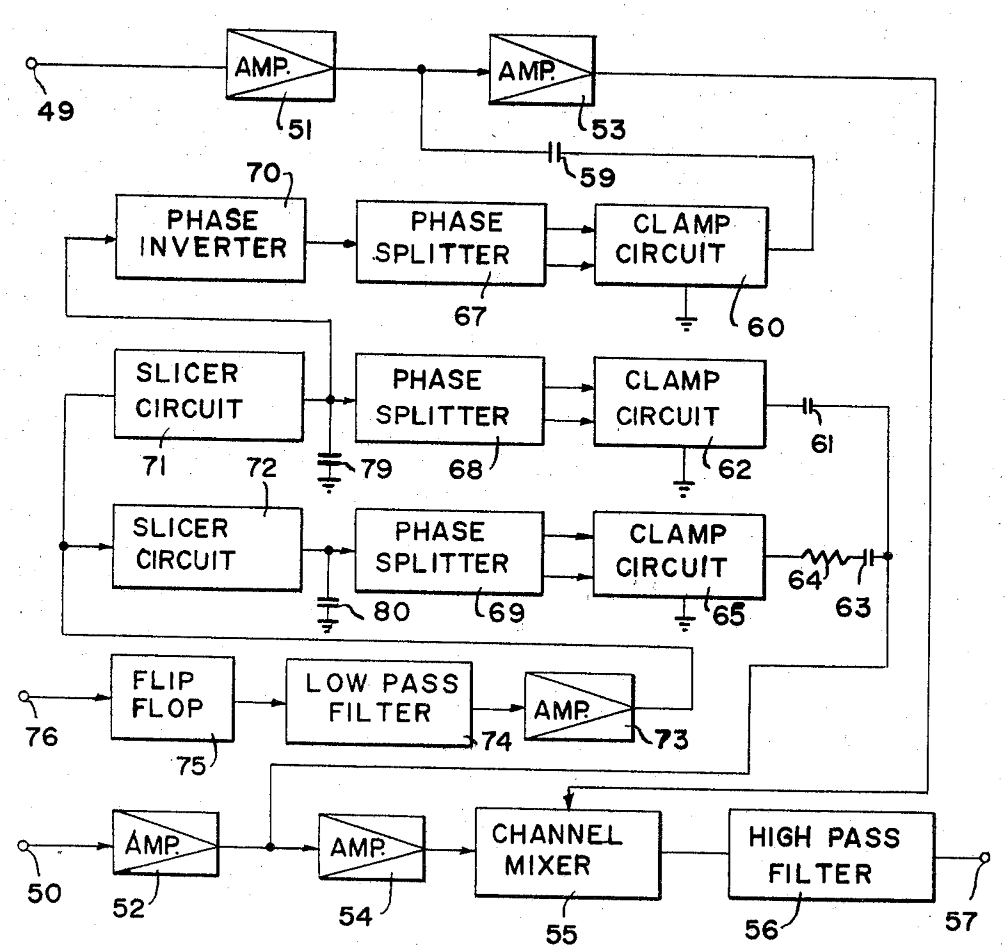
FIGURE 2 is a schematic block diagram of the channel mixing system usable in the system of FIGURE 1.

FIGURE 2 is a block diagram of the channel mixer circuit 41. In this circuit, the FM signals from channel amplifiers 39 and 40 (FIGURE 1) are applied to terminals 49 and 50 to be applied through equalizer amplifiers 51 and 52 and additional channel amplifiers 53 and 54 to a mixer circuit 55. The output of the mixer circuit 55 is connected through a high pass filter 56 to an output terminal 57 which is connected to the input of the demodulator circuit 42 (FIGURE 1).

The line interconnecting the output of the equalizer amplifier 51 and channel amplifier 53 is connected through a capacitor 59 and through a clamping circuit 60 to ground. When a suitable signal is applied at certain times to clamping circuit 60, it presents a very low impedance to effectively short-circuit the output of equalizer amplifier 51 and thus prevent signal transmission through the upper channel.

Similarly, the output line of the equalizer amplifier 52 is connected through a capacitor 61 and through a clamping circuit 62 to ground, to short-circuit the output of amplifier 52 and prevent signal transmission through the lower channel at certain times. In addition, the output of equalizer amplifier 52 is connected through a capacitor 63, a resistor 64 and a clamping circuit 65 to ground. Resistor 64 has a value such that signal transmission through the lower channel is reduced to a level which is lower but of substantial magnitude, when a control signal is applied to clamp circuit 65.

Through application of proper control signals to clamping circuits 60, 62 and 65 in accordance with this invention it is possible to obtain a smooth transition between the two channels without generating noise signals, interference and beat components and the like.

To control the clamp circuits 60, 62 and 65, inputs thereof are respectively connected to outputs of phase-splitter circuits 67, 68 and 69 having inputs respectively connected to outputs of a phase inverter circuit 70, a slicer circuit 71 and a slicer circuit 72. The input of phase inverter circuit 70 is connected to the output of slicer circuit 71. The inputs of slicer circuits 71 and 72 are connected together and to the output of an amplifier 73 having an input connected through a low-pass filter 74 to the output of a bistable multivibrator or flip-flop 75 having an input connected to a terminal 76 which is connected to the tonewheel 44 (FIGURE 1).

Figure 5:
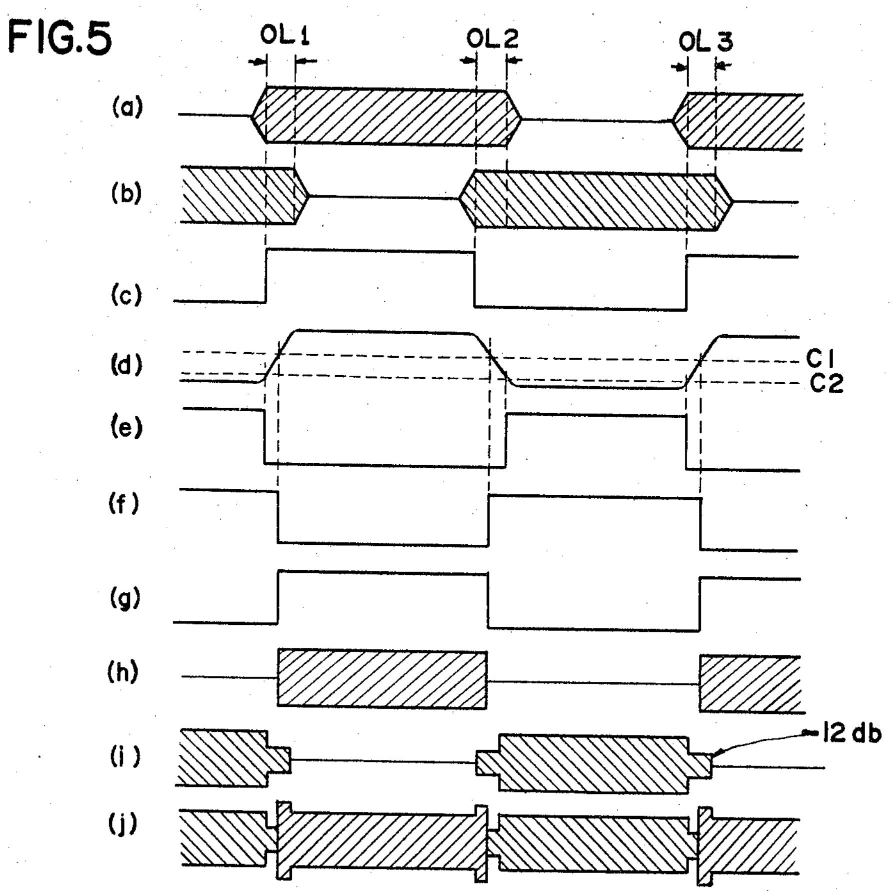
FIGURES 5(*a*)–5(*j*) illustrate waveforms produced at various points of the system, to explain and clarify its operation.

In operation, the FM signals applied to the input terminals 49 and 50 have waveforms as illustrated in FIGURES 5(*a*) and 5(*b*), each having alternate "on" and "off" portions with the end of the on portion of each signal being after the beginning of the on portion of the other signal, to provide overlap periods OL1, OL2, OL3, etc. The tonewheel 44 generates pulses which are approximately coincident with the beginnings of the overlap periods, such pulses being applied to trigger the flip-flop circuit 75, thereby generating a rectangular wave as illustrated in FIGURE 5(*c*). The rectangular wave so generated is applied to the low-pass filter 74 which converts the wave from one having sharp or steep leading and trailing edges into one having more gradually rising and falling leading and trailing edges as illustrated in FIGURE 5(*d*). This wave is applied to the slicer circuits 71 and 72 which operate at different levels. Slicer circuit 71 slices the wave of FIGURE 5(*d*) at an intermediate or center level C1, to produce a symmetrical rectangular wave as shown in FIGURE 5(*f*) while slicer circuit 72 operates at a lower level C2 to produce an asymmetrical rectangular wave as shown in FIGURE 5(*e*), having negative-going edges approximately coincident with the beginnings of the illustrated overlap periods OL1 and OL3, and having a positive-going edge approximately coincident with the end of the overlap period OL2.

When the asymmetrical rectangular wave of FIGURE 5(*e*) is applied to the clamp circuit it operates during the overlap periods OL1 and OL3 to reduce the amplitude level of the signal at the output of the equalizer amplifier 52 in the lower channel to a value which is lower but of substantial magnitude, and it also operates in a similar way during the overlap period OL2. At the same time the symmetrical rectangular wave of FIGURE 5(*f*) is applied to the clamp circuit 62 to short circuit the output of equalizer amplifier 52 to prevent signal transmission in the lower channel from the end of the overlap period OL1 to the beginning of the overlap period OL2. The result is a signal applied from amplifier 54 to mixer circuit 55 having a wave form as illustrated in FIGURE 5(*i*).

With regard to the upper channel, the output of slicer circuit 71 is inverted by the phase inverter 70 which applies to the clamp circuit 60 a rectangular wave having a form as illustrated in FIGURE 5(*g*), to short circuit the output of equalizer amplifier 51 until an intermediate point of overlap period OL1 and from an intermediate point of overlap period OL2 to an intermediate point of overlap period OL3. The result is a signal applied from the amplifier 53 to the mixer circuit 55 having a wave form as illustrated in FIGURE 5(*h*).

When the signals of FIGURES 5(*h*) and 5(*i*) are applied to the mixer circuit 55, it may produce an output signal having a wave form as illustrated in FIGURE 5(*j*). As illustrated the amplitude level decreases during about the first half of the overlap period OL1 and then increases to a value greater than normal during the remaining portion of the overlap period OL1. During the overlap period OL2, the level increases and then decreases. This assumes that the FM signals in the two channels are substantially in phase, which is not always the case, since even extremely small changes in the tape or the relative position of the magnetic heads will produce large phase variations. If the signals in the two channels are in out of phase relation, the amplitude level may be reduced during all of the overlap period, but will still have a substantial value, due to the differences in level. As a result, a substantial output signal is produced from the mixer circuit 55 at all times, and without any interruption of the signal. The variations in amplitude are of little consequence since the FM demodulator circuit 42 is comparatively insensitive to amplitude variations, particularly with a suitable limiter incorporated therein.

A specific feature of the invention is in the provision of capacitors 79 and 80 between ground and the outputs of slicer circuits, operative to reduce the slopes of the edges of the rectangular waves and to prevent transmission or leakage of components into the signal transmission channels having frequencies higher than the lower limit of the FM band.

Another specific feature is in the provision of the high pass filter 56 for alternating any signals generated by application of the clamping signals. Preferably, the filter 56 is an inductive M type filter having a cut-off frequency of 200 kc.

Figure 3:
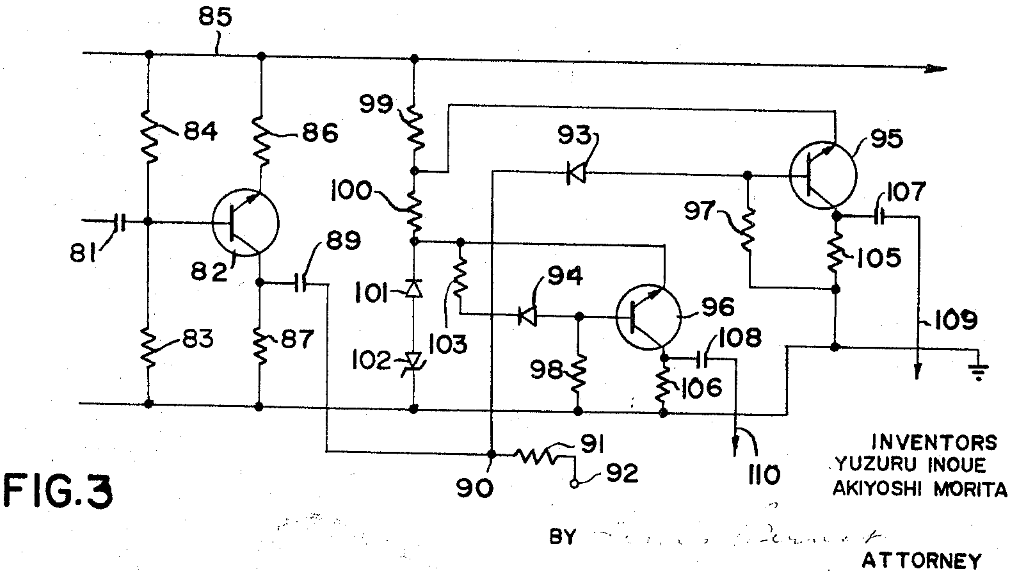
FIGURE 3 illustrates a circuit usable as slicer circuits of the system of FIGURE 2.

FIGURE 3 illustrates a circuit suitable for use as the slicer circuits 71 and 72. In this circuit, an input rectangular wave signal, from the amplifier 73 of FIGURE 2, is applied through a capacitor 81 to the base of a transistor 82, the base being connected through a resistor 83 to ground and through a resistor 84 to a power supply line 85. The emitter of transistor 82 is connected through a resistor 86 to the line 85 while the collector thereof is connected through a resistor 87 to ground and through a capacitor 89 to a circuit point 90. Circuit point 90 is connected through a resistor 91 to a terminal 92 for test purposes, and to the cathodes of a pair of diodes 93 and 94 to the bases of a pair of transistors 95 and 96, such bases being connected through resistors 97 and 98 to ground. The emitter of the transistor 95 is connected through resistor 99 to the line 85, while the emitter of transistor 96 is connected through a resistor 100 to the emitter of transistor 95, through a pair of voltage regulating diodes 101 and 102 to ground and through a resistor 103 to the circuit point 90. As those skilled in the art know, this voltage regulation may be accomplished by placing a Zener diode 102 back-to-back with a normal silicon diode 101. The Zener diode regulates voltage. As connected in the circuit, the normal diode 10 has temperature characteristics inversely similar to the temperature characteristics of the Zener diode 102; therefore, there is an automatic compensation so that the regulated voltage does not change as a function of temperature variation.

The collectors of transistors 95 and 96 are connected through resistors 105 and 106 to ground and through capacitors 107 and 108 to output lines 109 and 110.

In operation, the transistor 82 applies the rectangular wave of FIGURE 5(*d*) to the diodes 93 and 94. During the negative portion of the wave, the diodes 93 and 94 conduct to render the transistors 95 and 96 non-conductive. As the wave moves in a positive direction, the diode 93 becomes non-conductive and the transistor 95 conducts first, while after a further increase in the positive direction the diode 94 becomes non-conductive and the transistor 96 conducts. Thus signals are generated on output lines 109 and 110 having waveforms as illustrated in FIGURES 5(*e*) and 5(*f*).

Figure 4:
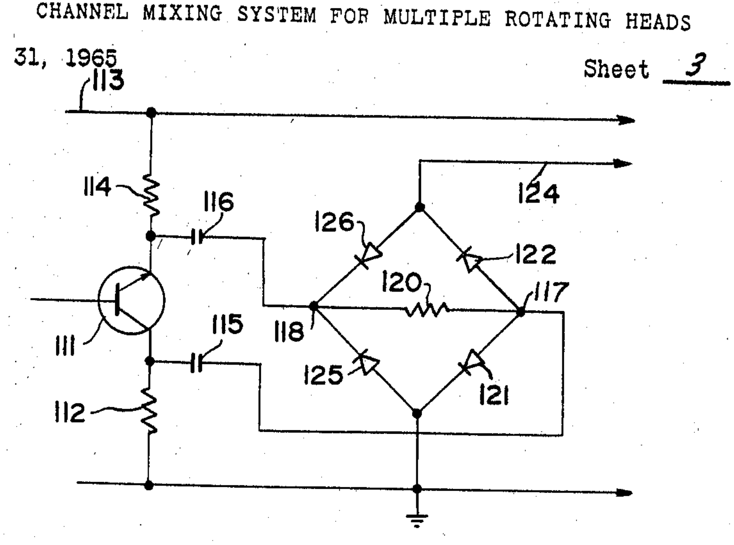
FIGURE 4 illustrates a combined phase splitter and clamping circuit usable in the system of FIGURE 2.

FIGURE 4 illustrates a combined phase splitter and clamping circuit suitable for use as circuits 67 and 60, circuits 68 and 62 and circuits 69 and 65. In this circuit an input signal such as obtained from circuit 70, circuit 71 or circuit 72, is applied to the base of a transistor 111 having a collector connected to ground through a resistor 112 and an emitter connected to a power supply line 113 through a resistor 114. The collector and emitter are also connected through capacitors 115 and 116 to circuit points 117 and 118 which are connected together through a resistor 120. Circuit point 117 is connected to the anodes of diodes 121 and 122 having cathodes respectively connected to ground and an output line 124 while circuit point 118 is connected to the cathodes of diodes 125 and 126 having anodes respectively connected to ground and the output line 124.

In operation, when the transistor 111 is conductive, the potentials of the collector and emitter thereof are close to a value midway between ground and that of the line 113, and diodes 121, 122, 125 and 126 are non-conductive. However, when transistor 111 is cut off, all four diodes are rendered conductive and output line 124 is effectively connected to ground through a low impedance.

By way of illustrative example and not by way of limitation the components of the circuits of FIGURES 2, 3 and 4 may have the following values:

| Reference numeral: | | Value |
|---|---|---|
| **59** | microfarad | 0.1 |
| **61** | do | 0.1 |
| **63** | do | 0.1 |
| **64** | ohms | 220 |
| **79** | microfarads | 0.5 |
| **80** | do | 0.5 |
| **81** | do | 30 |
| **83** | ohms | 5600 |
| **84** | do | 5600 |
| **86** | do | 220 |
| **87** | do | 3300 |
| **88** | do | 220 |
| **89** | microfarads | 30 |
| **91** | ohms | 1000 |
| **97** | do | 120,000 |
| **98** | do | 120,000 |
| **98** | do | 150 |
| **100** | do | 470 |
| **103** | do | 8200 |
| **105** | do | 4700 |
| **106** | do | 3300 |
| **107** | microfarads | 30 |
| **108** | do | 30 |
| **112** | ohms | 680 |
| **114** | do | 680 |
| **115** | microfarads | 50 |
| **116** | do | 50 |
| **120** | ohms | 2700 |

The output impedance of the equalizer amplifier 52 is preferably such that with the resistor 64 having a value of 220 ohms, the amplitude level is reduced about 12 db, for example, when the clamping circuit 65 is operative.

It will be understood that modifications and variations may be effected without departing from the spirit and scope of the novel concepts of this invention.

We claim as our invention:

1. In a channel mixing system for producing a continuous FM signal in response to a plurality of received FM signals, each of said received FM signals having alternate on and off portions with the end of the on portion of each signal being after the beginning of the on portion of another signal to provide an overlap period, a mixer circuit, means for applying all of said signals to said mixer circuit at substantially the same amplitude level during non-overlap periods, and means operative in each overlap period to change the amplitude level of only one of the overlapped signals, whereby a substantial output signal is produced by said mixing circuit irrespective of variations in the relative phase of said overlapped signals.

2. In a channel mixing system for producing a continuous FM signal in response to a plurality of received FM signals, each of said received FM signals having alternate on and off portions with the end of the on portion of each signal being after the beginning of the on portion of another signal to provide an overlap period, a mixer circuit, means for applying all of said signals to said mixer circuit at substantially the same amplitude level during non-overlap periods, means for producing a clamping pulse signal during overlap periods, and means responsive to said clamping pulse signal for clamping the amplitude level of one of the overlapped signals to a lower value than the amplitude level of the other overlapping signal.

3. In a channel mixing system for producing a continuous FM signal in response to first and second received FM signals, each of said received FM signals having alternate on and off portions with the end of the on portion of each signal being after the beginning of the on portion of the other signal to provide an overlap period, a mixer circuit for combining both of said signals, first clamping means for cutting off transmission of said first signal, second clamping means for cutting off transmission of said second signal, third clamping means for reducing transmission of said second signal to a level of substantial value but less than that of said first signal, means for applying to said first and second clamping means a pair of symmetrical rectangular wave signals of opposite phase, and means for applying to said third clamping means an asymmetrical rectangular wave signal.

4. In a magnetic recording and reproducing system including a pair of co-rotatable magnetic heads for reproducing from divided signal areas of a magnetic medium first and second FM signals each having alternate on and off portions with the end of the on portion of each signal being after the beginning of the on portion of the other to provide overlap periods, a mixer circuit for combining said first and second signals, means responsive to rotation of said heads for generating a first rectangular wave form signal, means for reforming said first rectangular wave form signal to generate a second rectangular wave form signal having sloped leading and trailing edges with durations approximately the same as said overlap periods, first slicer means for slicing said second rectangular wave form signal at a center level to produce a symmetrical control signal, second slicer means for slicing said second rectangular wave form signal at another level to generate an asymmetrical control signal, and means responsive to said symmetrical and asymmetrical control signals for applying said first FM signal to said mixer at a reduced amplitude level during overlap periods.

5. A magnetic recording and reproducing system comprising a pair of co-rotatable magnetic heads for reproducing first and second FM signals from divided signal areas of a magnetic medium, each of said signals having alternate on and off portions with the end of the on portion of each signal occurring after the beginning of the on portion of the next of said signals to provide overlap periods a mixer circuit for combining said first and second signals, means responsive to rotation of said heads for generating a first rectangular wave form signal, means for reforming said first rectangular wave form signal to generate a second rectangular wave form signal having sloped leading and trailing edges with durations approximately the same as said overlap periods, first slicer means for slicing said second rectangular wave form signal at a center level to produce a symmetrical rectangular signal, second slicer means for slicing said second rectangular wave form signal at another level to generate an asymmetrical rectangular signal, means for reforming said symmetrical rectangular signal and said asymmetrical rectangular signal to generate respectively a symmetrical control signal and an asymmetrical control signal, each of said control signals having sloped leading and trailing edges to prevent leakage into the output of said mixer circuit of components having frequencies higher than the lower limit of the frequency band of said first and second FM signals, means responsive to said symmetrical and asymmetrical control signals for applying said first FM signal to said mixer at a reduced amplitude level during overlap periods, and high pass filter means for suppressing all frequency components included in said symmetrical and asymmetrical control signals and passing the combined signal of said first and second signals.

References Cited

UNITED STATES PATENTS

| | | | |
|---|---|---|---|
| 3,152,226 | 10/1964 | Stratton | 179—100.2 |
| 3,239,603 | 3/1966 | Kihara | 178—6.6 |
| 2,979,557 | 4/1961 | Schroeder | 178—6.6 |
| 3,175,034 | 3/1965 | Kihara | 179—100.2 |

BERNARD KONICK, *Primary Examiner.*

J. RUSSELL GOUDEAU, *Assistant Examiner.*

U.S. Cl. X.R.

178—6.6